Oct. 27, 1970 — P. M. SIEVERT ET AL — 3,536,867
UNDERWATER CABLE CONNECTOR
Filed July 11, 1967 — 3 Sheets-Sheet 1
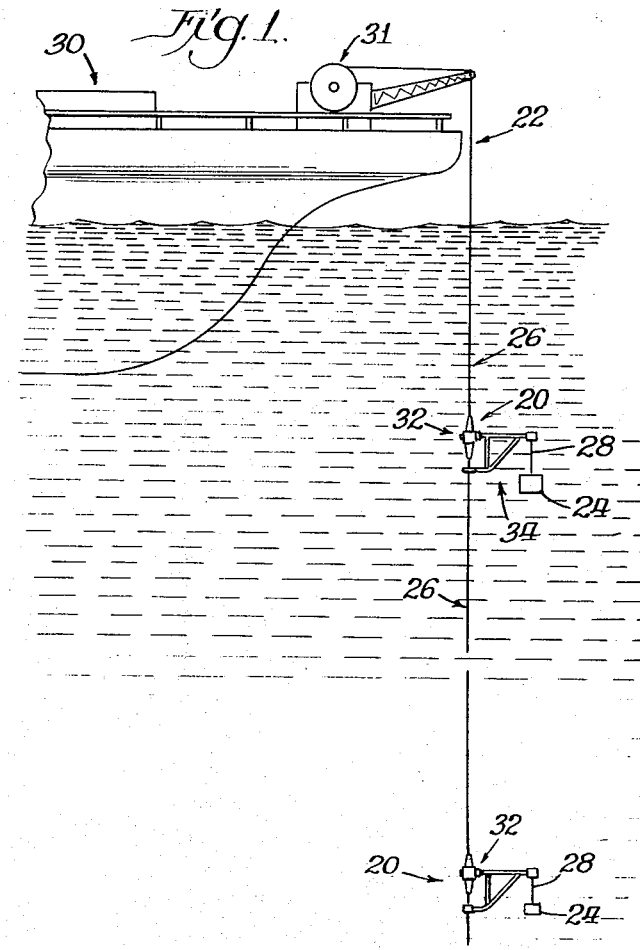
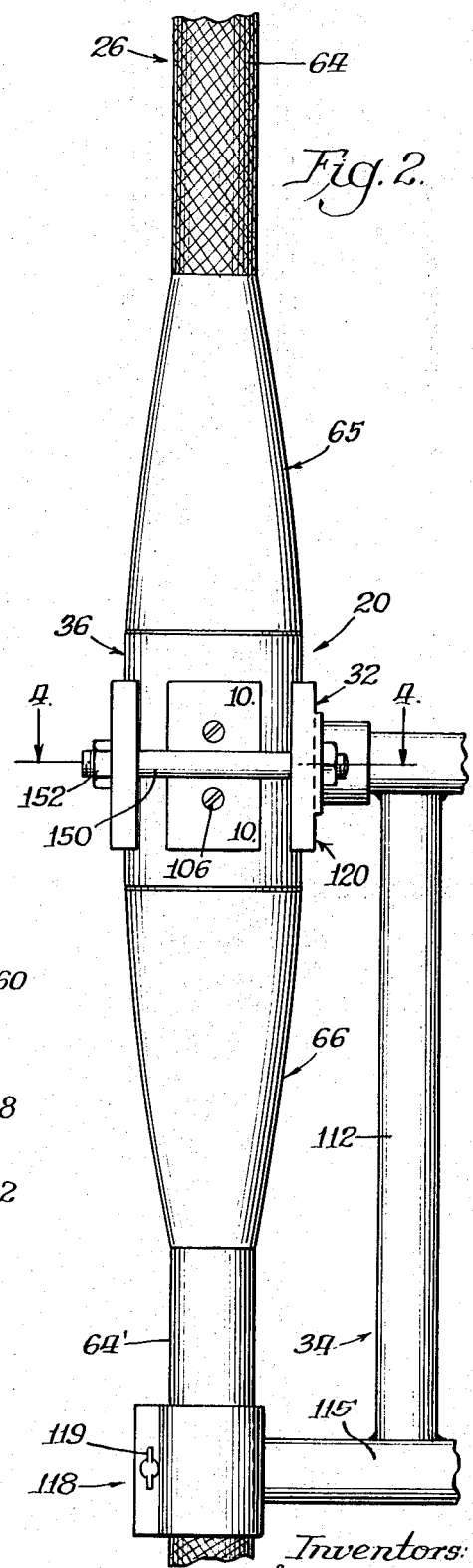
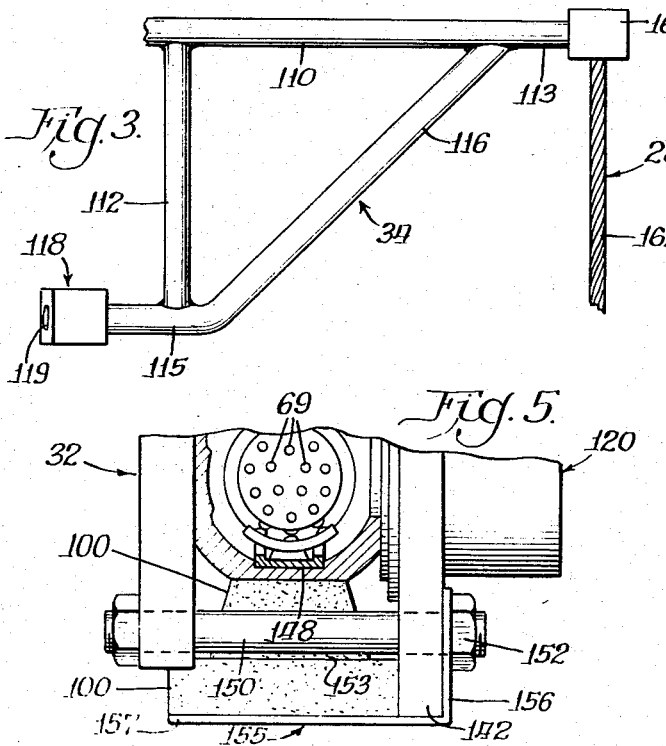
Inventors:
Paul M. Sievert
Carl G. Wennerstrom
By Robert L. Slater, Jr.
Atty.

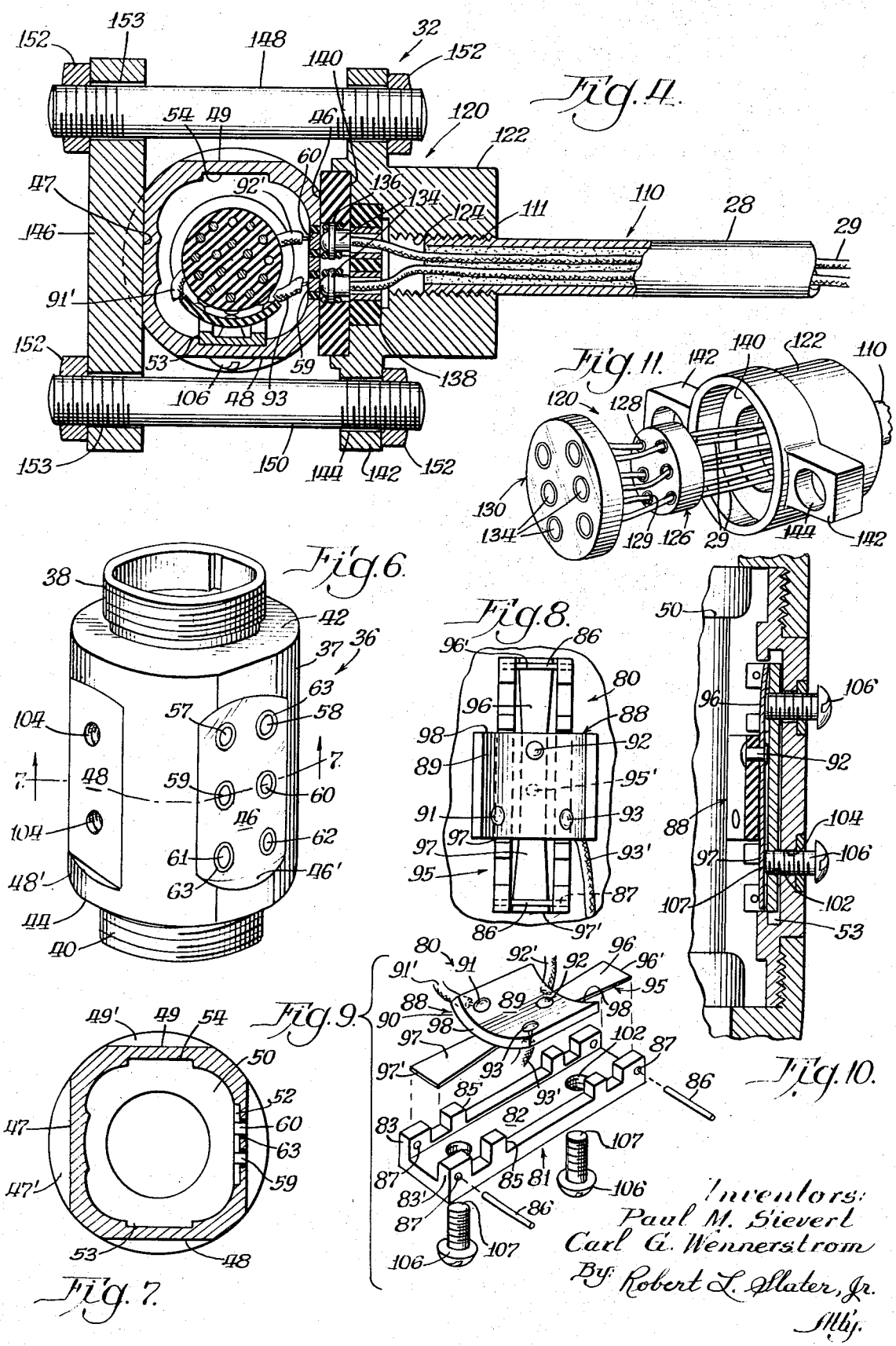

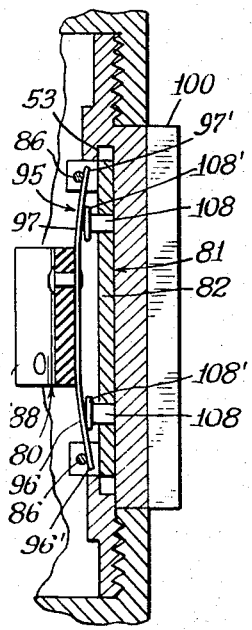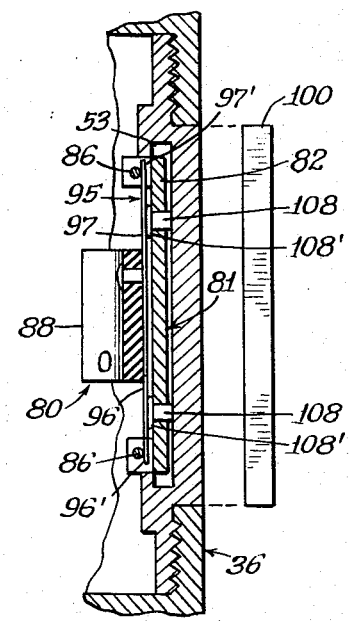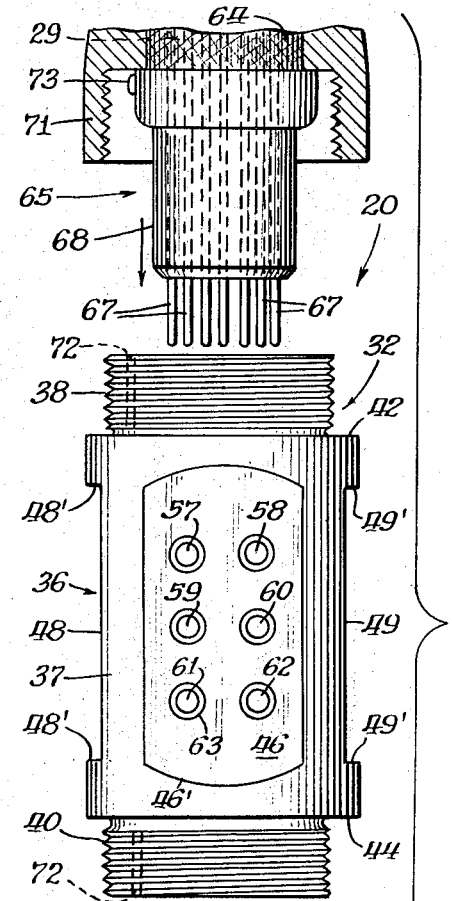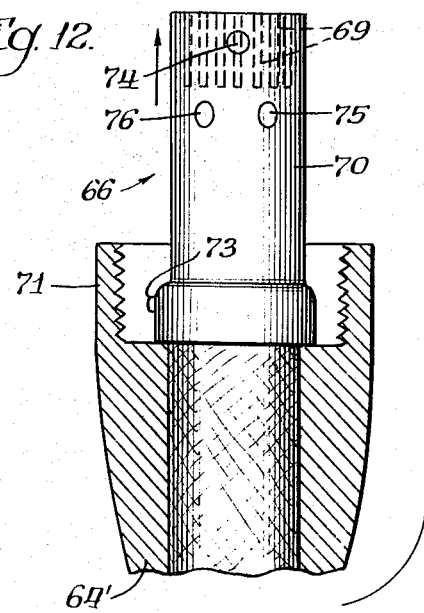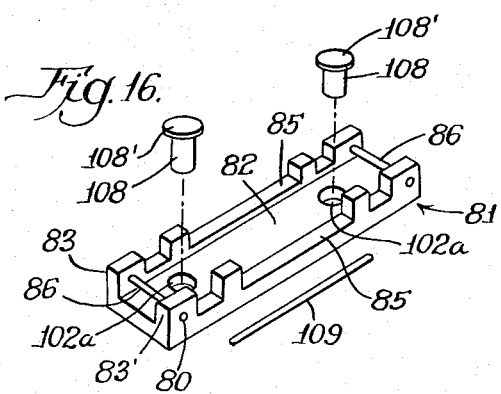

United States Patent Office
3,536,867
Patented Oct. 27, 1970

3,536,867
UNDERWATER CABLE CONNECTOR
Paul M. Sievert, Oak Park, and Carl G. Wennerstrom, Evanston, Ill., assignors to Sievert Electric Co., Chicago, Ill., a corporation of Illinois
Filed July 11, 1967, Ser. No. 652,490
Int. Cl. H01r 33/30
U.S. Cl. 200—51.07                                    6 Claims

ABSTRACT OF THE DISCLOSURE

A fluid tight cable connector for electrically and mechanically coupling lengths of cable together in a branched configuration. The connector also provides a secure support for data-taking instruments suspended from the cable and electrical connection to the instruments by one of the branches. Electrical disconnection means are provided for the supporting branch.

BACKGROUND OF THE INVENTION

The invention relates generally to a fluid tight electrical cable connector, and more particularly relates to an electrical cable connector for providing secure and liquid tight branched cable connections and including means for supporting suspended oceanographic instruments.

The underwater or submarine cable connectors used in the past for electrically and mechanically connecting lengths of cable were adequate for extending the cable in only one direction from a point of reference. These prior connectors, however, were not suitable for connecting lengths of electrical cable in a branched or multi-directional configuration. One of the previous techniques used for branching cable from a main cable was to splice the cable branch directly to the main cable after cutting away a small area of the insulting sheath covering the individual electrical conductors of the main cable. Although, the spliced connections were coated or recovered with insulated material, liquid seepage eventually wore away the covering. This frequently resulted in an electrical short circuit. Another problem with these spliced connections was that they often weakened and severed apart due to the stresses and strains exerted on the cable; particularly when the instruments supported by the cable connectors were of any appreciable weight.

In earlier practices with underwater cable arrangements, bulky and usually permanent attachments were used to connect cable lengths together to form the cable. These attachments normally precluded the winding of the connected cable to a cable drum. Thus, it was required to store the cables in loose coils which frequently became entangled either during the winding or the unwinding of the cable coils.

Geological field measurements, field testing of weapons, and oceanographic work frequently require the positioning of a number of instruments in spaced relationship within a field or region under observation. Particularly in oceanographic observations, it has been found advantageous to physically support, electrically power and monitor these instruments by means of a single main cable. In the past, however, complex connecting means were used to connect the instruments to the main cable. Thus, to disassociate the instruments from the main cable required substantial time and effort.

SUMMARY OF THE INVENTION

The cable connector of this invention provides means for electrically and mechanically coupling lengths of electrical cable together in a liquid tight relationship and in a branched configuration. Electrical control means operable from the outside of the connector affords means for electrically connecting and disconnecting a branch cable from a main cable without severing the mechanical association of the branch cable with the main cable.

The cable connector also affords a secure mechanical support for instruments suspended from the cable and thus assures their safe retrival.

The cable connector includes securing means which enables branch cables to be quickly disconnected from a main or primary cable. After the branch cables are disconnected, the main cable may be conveniently wound around a drum for storage.

It is therefore a primary object of the invention to provide a fluid tight cable connector for electrically and mechanically connecting lengths of cable in a branched configuration.

Another primary object is to provide an electrical control means for electrically connecting and disconnecting the main cable from the branch cable without severing the mechanical association of the main cable with the branch cable.

A further object of this invention is to provide a multiple conductor cable assembly suitable for use in severe environments and having means for rapidly connecting and disconnecting brached circuits at intermediate distances along the cable.

Another object is to provide a cable connector suitable for providing a secure support for underwater instruments.

Another object is to provide a combination fluid tight electrical cable connector and support for underwater instruments.

Another object is to provide a cable connector adapted for quick and secure connections and quick disconnections of the main cable segments and the branch cables.

Still another object is to provide a cable connector for coupling cable lengths together whereby the connected lengths may be conveniently wound and unwound on a cable drum.

These and other objects and advantages of the invention will become apparent from the illustrations in the accompanying drawings and the following specification and claims.

BRIEF DESCRIPTION OF THE DRAWINGS

Referring to the drawings in which the same characters of reference are employed to indicate corresponding or similar parts throughout the several figures of the drawings:

FIG. 1 is a pictorial view showing a cable extending downward into the water from a ship and two submarine connectors embodying the principles of the invention connecting lengths of the cable together and supporting oceanographic istruments;

FIG. 2 is an enlarged elevational view with portions cut away to illustrate the mechanical association of the cable connector with the main and branch cables;

FIG. 3 is an elevational view illustrating the instrument hangar section of the cable connector;

FIG. 4 is a fragmentary sectional view of the cable coupling section of the cable connector, taken on the plane of the line 4—4 in FIG. 2, viewed in the direction indicated, and Showing the connection of the main cable with the branch cable;

FIG. 5 is a sectional view, similar to FIG. 4, illustrating a magnetic means for controlling the making and breaking of the electrical contact between the main cable and the branch cable;

FIG. 6 is a perspective view of the body section of the cable connector;

FIG. 7 is a sectional view of the body section taken on the plane of the line 7—7 in FIG. 6 and viewed in the direction indicated;

FIG. 8 is a plan view of the movable electrical contact device for electrically connecting the branch cable to the main cable;

FIG. 9 is an exploded view of the movable contact device and showing the screws for controlling the movement of the device;

FIG. 10 is a fragmental elevational sectional view taken on the plane of the line 10—10 in FIG. 2, viewed in the direction indicated, and showing the electrical non-contact position of the movable contact device and the electrical contact position in phantom;

FIG. 11 is a fragmentary partially exploded perspective view of the clamping connector member of the branch cable;

FIG. 12 is an exploded view showing the component parts for connecting an upper segment of the main cable to a lower segment thereof;

FIG. 13 is a sectional view, similar to FIG. 10, showing the movable electrical contact device in an electrical non-contact position when a magnetic means controlling the movement of the device is removed from the body section of the connector;

FIG. 14 shows the movable electrical contact device in an electrical contact position when the magnetic means is secured to the outside of the body section;

FIG. 15 is a bottom view of the support base for the movable contact device showing the impeller members connected together by a wire member;

FIG. 16 is a perspective exploded view showing the impeller members and wire member spaced from the support base.

DESCRIPTION OF THE PREFERRED EMBODIMENT

Referring now to the several figures of the drawings, reference numeral 20 indicates generally a cable connector for electrically and mechanically coupling together lengths of cable designated generally by the reference numeral 22. The cable connectors 20 are adapted to support underwater instruments 24 (see FIG. 1).

The cable 22 includes a main or primary cable 26 and branch cables 28 (FIG. 4). The cables 26, 28 include a plurality of electrical conducting leads or wires 29 securely bundled together (FIGS. 4, 11 and 12). In FIG. 1, the cable 22 extends downward into the water from a ship 30. The cable 22 is lifted in and out from the water by a shipboard crane 31. The instruments 24 are suspended from the branch cable 28 and supported by the connectors 20 at predetermined spaced intervals along the main cable 26.

The connector 20 comprises a coupling section 32 (see FIGS. 2, 4, 5 and 12) and a hangar section 34 (FIGS. 2 and 3). The coupling section 32 connects the branch cable 28 with the main cable 26. The instruments 24 are suspended into the water from the hangar section 34. The coupling section 32 is adapted to provide a support base for the instruments 24 (FIG. 1).

The coupling section 32 of the cable connector 20 includes a hollow body section 36 (FIGS. 4, 5 and 6) open at both ends thereof. The body section 36 is machined from cylindrical stock of a rugged material.

As shown in FIG. 6, the body section 36 comprises an intermediate portion 37 with externally threaded hollow neck portions 38, 40 formed outwardly from the opposed ends of the intermediate portion 37. The inside diameter of the intermediate portion 37 is greater than the inside diameter of the neck portions 38, 40. The outer surface between the body portion 37 and the neck portions 38, 40 define respectively shoulders 42, 44.

A plurality of flat surfaces indicated respectively by the numerals 46, 47, 48 and 49 (FIGS. 4, 6 and 7) are formed spaced apart around the outer peripheral surface of the intermediate portion 37 and extend longitudinally between the shoulders 42, 44. As shown, the adjacent flat surfaces 46 and 48 are diametrically opposed respectively to the flat surfaces 47 and 49. Flat surfaces 46 and 47 have a greater width than flat surfaces 48, 49. An upper and lower edge protrude outward from the flat surfaces and are designated by the prime (') of the corresponding flat surface.

Circular lips 50 connect the inside surfaces of the neck portions 38, 40 with the inside of the intermediate portion 37 (FIGS. 7 and 10).

Elongated grooves indicated by the numerals 52, 53 and 54 are formed in the inside wall surface of the intermediate portion 37 and extend longitudinally between the lips 50, 51. The grooves 52, 53 and 54 define compartments in the inside wall surface. The groove 52 has a greater width than grooves 53 and 54. The groove 52 and a flat surface 46 are on opposite sides of a common wall, the grooves 53 and flat surface 48 are on opposite sides of a common wall, the groove 54 and flat surface 49 are also on opposite sides of a common wall (FIG. 7).

As shown in FIG. 6, electrical conducting terminals indicated by the reference numerals 57 to 62 are mounted within the area of the wall of the body section 36 comprising the flat surface 46 and groove 52. Each of these terminals are positioned within a dielectric seat 63, thereby insulating the terminals from the electrical conducting body wall. The outside end of the terminals are flush or even with the flat surface 46 (FIGS. 4, 6 and 7). The inside ends of the terminals protrude inwardly for convenience of connection with electrical conducting wires or leads.

The primary cable section 26 comprises a plurality of cable segments connected together by the cable connector 20. An upper segment 64 (FIGS. 2 and 12) is connected to a lower segment 64' inside the hollow of the body section 36. Although, any suitable connecting means may be used, a male component 65 of a bayonet connector (see FIG. 12) is securely attached to the lower end of the upper segment 64 for mating with a complementary female bayonet component 66 securely attached to the upper end of the lower segment 64'.

The male component 65 of the bayonet connector includes a plurality of prongs 67 which extend outward from an upper tubular portion 68. As shown in phantom in FIG. 12, the individual leads 29 of the upper segment 64 extend into the tubular portion 68 and are attached to the prongs 67.

The female component 66 of the bayonet connector includes a plurality of sockets 69 recessed inside a lower tubular portion 70 (see FIGS. 4, 5 and 12). Similarly, the individual leads 29 of the lower segment 64' extend into the tubular portion 70 and are attached to the sockets.

An internally threaded cap 71 surrounds and is spaced from the inner end of the upper tubular portion 68 and lower tubular portion 70.

Keyways 72 shown in phantom in FIG. 12 are formed in the inside wall surface of the neck portions 38, 40 and extend inwardly from the outer ends thereof. A key 73 protrudes outward from the upper and lower tubular portions 68, 70 of the male and female components 65, 66 adjacent the inner ends thereof and is positioned in the space defined by the caps 71. Keys 77 fit within the keyways 72 when the prongs 67 are seated inside the sockets 69 to make an electrical connection therewith. After the connection is made, the caps 71 are screwed tightly on the neck portions 38, 40 of the body section 36 to afford a secure but readily detachable connection of the cable segments 64, 64'. Thus, the bayonet connector electrically and mechanically connects the cable segments 64, 64' together inside the body section 36.

As shown in FIG. 12, three electrical conducting posts 74, 75 and 76 extend outward from the outer surface of the lower tubular portion 70 of the female component 66 of the bayonet connector adjacent the outer end thereof. Each post 74, 75 and 76 is electrically connected to a preselected socket 69 of the female component 66. Other posts (not shown) may similarly extend outward from another area of the female component 66 or from the male component 65 of the bayonet connector.

Referring now to FIGS. 4, 5, 8 to 10 and 13 to 16, a movable electrical contact device indicated generally by the reference numeral 80 will be described. The contact device 80 comprises a support base 81 dimensioned to slidably fit within the grooves 53 and 54 inside the intermediate portion 37 of the body section 36. The support base 81 is substantially rectangularly in shape (FIG. 9) and includes a bottom wall 82 and side walls 83, 83' extending outwardly substantially perpendicular from opposed edges of the bottom wall 82. An elongated tapered notch 85 is centrally disposed between the lateral ends of the walls 83, 83'. The edge of the notch 85 tapers inwardly from the outside surface of the side walls 83, 83' to the inside surface thereof.

A pair of spaced apart pintles 86 extend through opposed openings 87 formed in the walls 83, 83' adjacent the lateral ends thereof. The pintles 86 are spaced above and span across the bottom wall 82.

A saddle member 88 is movably associated with the base 82. The saddle member 88 has a concave inner surface 89 and a convex outer surface 90. The concave surface 89 is complementary with the convex surface of the female component 66 of the bayonet connector to provide a positive association when in contact therewith. The saddle member 88 is constructed of a dielectric material.

Electrical conductor buttons 91, 92 and 93 are securely embedded inside the saddle member 88 and protrude out from the concave surface 89. Electrical conducting leads or wires 91', 92' and 93' are respectively connected to the buttons 91, 92 and 93 on the inside of the saddle member 88 and extend outward from the saddle member 88. One or more of the leads 91', 92' and 93' are soldered or otherwise connected to preselected terminals 57, 58, 59, 60, 61 or 62 (FIGS. 4 and 6) in accordance with the circuit requirement for using the instrument 24 suspended from the hangar section 34.

A leaf spring indicated generally by the reference numeral 95 is mounted to the concave outer surface 90 at point 95' of the saddle member 88 (FIG. 8). The leaf spring 95 comprises a first spring segment 96 and a second spring segment 97 extending outward from opposite arcuate sides 98 of the saddle member 88. The outer ends of the leaf spring segments 96' and 97' have a greater width than the inner ends of the segments. The width of the leaf spring segments 96, 97 tapers inwardly from the outer ends 96', 97' to the inner ends at point 95'. The outer ends 96', 97' may be slightly bent toward the saddle member 88; thus affording a greater surface area when the pintles 86 are contacted by the spring outer ends 96' and 97'.

The movable contact device 80 is positionable in either the elongated groove 53 or 54 depending upon the location of the posts 74, 75 and 76 of the bayonet connector. The device 80 may be screw mounted to the wall of the groove as shown in FIGS. 4 and 10 or alternatively the device 80 may be magnetically attracted to the wall of the groove by a magnet 100 as shown in FIGS. 5, 13 and 14.

The screw mounting of the movable contact device 80 inside the groove will be considered first. Accordingly, a pair of spaced threaded openings 102 are formed in the bottom wall 82 of the support base 81. Threaded openings 104 are formed in the body section 36 to align with openings 102 when the contact device is operatively positioned inside the groove 53 or 54. FIGS. 6 and 10 illustrate the threaded opening 104 extending through the flat surface 48 and communicating with the groove 53. Set screws 106 engage the openings 102 and openings 104 to secure the support base 81 inside the groove 53.

The saddle member 88 is operatively positioned on the support base 81 in the notch 85 when the outer ends 96', 97' of the leaf spring segments 96, 97 are positioned underneath the pintles 86 (see FIG. 8). This movably locks the saddle member 88 in place on the support base 81.

The set screw 106 functions to maintain the device 80 in the selected groove 53 or 54 while simultaneously providing electrical control means for breaking and making the electrical contact between the buttons 91, 92 and 93 of the saddle member 88 and the posts 74, 75 and 76 of the female component 66 of the bayonet connector.

The length of the screw 106 is dimensioned whereby the outer tips 107 thereof force the leaf spring segments 96, 97 away from the bottom wall 82 of the support base 80 as shown in FIG. 10. When the screws 106 are extended further into the body section 36, the force of the screws 106 causes the outer ends 96', 97' of the spring segments 96, 97 to brace against the pintles 86 and the portions of the spring segments 96, 97 between the ends 96', 97' to bow away from the support base as shown in phantom in FIG. 10. The saddle member 88, positioned at the center of leaf spring 95, is lifted away from the support base when the leaf spring is bowed outwardly. Thus, the concave surface 89 of the lifted saddle member 88 embraces the female component 66 of the bayonet connector whereby electrical contact is made between the buttons 91, 92 and 93 and the posts 74, 75 and 76 thus electrically connecting the main cable with the branch cable.

If the set screws 106 are screwed outwardly from the electrical contact position for the saddle member, the spring segments 96, 97 unflex and resiliently return to their original position; thereby breaking the electrical contact between the buttons 91, 92 and 93 and posts 74, 75 and 76. This electrically breaks the connection between the main cable and branch cable.

Turning now to FIGS. 5, 13 and 14 the movement of the electrical contact device 80 by the magnetic force from the magnet 100 will be described. The magnetic force secures the device 80 inside the groove 53 of the body section 36 and causes an electrical connection to be made between the buttons 91, 92 and 93 of the saddle member 88 and posts 74, 75 and 76 from the female component 66 of the bayonet connector. In order for the magnet 100 to be effective, the body section 36 is non-magnetic and the support base 81 is magnetic. The magnet 100 is rigidly secured to the flat surface 48 of the body section 36 by any suitable means. An example of such means will be described further in the specification. The strength of the magnetic field pulls the support base 81 tightly against the wall of the groove 53.

A pair of impeller members 108 having a rivet-like shape (FIGS. 13, 14, 15 and 16) extend within openings identified by the designation 102a. The impeller members 108 comprise a head 108' at the inner ends thereof. The diameter of the openings 102a is larger than the cross-sectional area of the elongated portion of the impeller members 108 but smaller than the head 108'. The outer ends of the impeller members 108 are connected together by a wire member 109 positioned within an elongated narrow groove 109' (FIG. 15) formed in the outside surface of bottom wall 82. The cooperation of the heads 108' and the wire member 109 connected to the impeller members 108, prevent the impeller members 108 from falling out from the openings 102a. The outer ends of the impeller members 108 connected to the wire member 109 normally tend to extend out from the bottom surface of the bottom wall 82 in the position seen in FIG. 13.

In the non-operative position for the magnetically controlled movable contact device 80, which is when the magnet 100 is removed from the body section 36 (FIG. 13), the buttons 91, 92 and 93 of the saddle member 88 are spaced from the posts 74, 75 and 76 of the component 66 of the bayonet connector. The outer ends 96', 97' of the leaf spring 95 lie underneath the pintles 86. The leaf spring 95 is normally biased outwardly toward the bottom wall 82 of the support base 81. The spring 95 applies a restraining force against the inner or head ends 108' of the impeller member 108 and thereby maintaining the outer ends of the impeller members 108 extended out from the bottom wall 82.

After the movable contact device 80 is positioned in the groove 53 inside the intermediate portion 37 of the body section 36 and the magnet 100 is secured in place as shown in FIG. 14, the magnetic force from the magnet 100 pulls the support base 81 toward the wall of the groove 53. The outward movement of the support base 81 into a tight abutting relationship with the wall of the groove 53 forces the impeller members 108 further inward whereby the inner head ends 108' of the impeller members 108 exert an inward force against the leaf spring 95. The spring outer ends 96', 97' move inwardly until contacting the pintles 86 which inhibit any further movement of the outer ends 96', 97'. However, the portion of the leaf spring 95 between the outer ends 96', 97' continue to move inwardly causing the leaf spring 95 to bow. The greater width at the outer ends 96', 97' of the leaf spring 95 aids the bowing action. Since the saddle member 88 is positioned at the apex of the bow, the concave surface 89 embraces the female component 66 of the bayonet connector; thereby electrically connecting the buttons 91, 92 and 93 with the posts 74, 75 and 76. The connections of the buttons with the posts electrically connect the main cable 26 with the branch cable 28.

Upon the removal of the magnet 100 from association with the flat surface 48, support base 81 tends to move slightly inwardly away from the wall of the groove 53 and is, therefore, no longer in a tight abutting relationship with the wall of the groove. The impeller members 108 are then urged outwardly toward the wall of the groove 53 by the resilient force of the leaf spring 95. Thus, as the leaf spring 95 returns to its original position (FIG. 13), the saddle member 88 moves outwardly, the buttons 91, 92 and 93 disconnect from the posts 74, 75 and 76 and the branch cable 28 is electrically disconnected from the main cable 26.

Turning now to FIGS. 1, 2, 3, 4 and 11, the hangar section 34 of the connector 20 for suspending and supporting the instruments 24 will be described. The hangar section 34 comprises a rigid horizontal strut 110 having an externally threaded inner end 111 (FIG. 4). A rigid vertical strut 112, is integrally mounted adjacent to the inner end 111 of the horizontal strut 110 and forming an inverted L shape therewith.

A rigid diagonal strut 114 extends on an incline outwardly from the lower end of the vertical strut 112 and connects with the horizontal strut 110 adjacent the outer end 113 thereof. The diagonal strut 114 comprises a lower horizontal portion 115 which is integrally formed to the lower end of the vertical strut 112 and extends inward thereform and an inclined portion 116 connected between the horizontal portion 115 ad the horizontal strut 110.

A substantially U-shaped claw 118 is integrally formed to the inner end of the horizontal portion 115 of the diagonal strut 114. The claw 118 secures the hangar section 34 to the lower segment 64' of the main cable 26 (FIG. 2). Although any suitable securing means is contemplated, the claw 118 may be locked in place by a cotter pin 119 (FIGS. 2 and 3).

The horizontal strut 110 is hollow to provide a conduit for the branch cable 28 (FIG. 4). The inner end 111 of the horizontal strut 110 threadedly engages a clamping connector member indicated generally by the reference numeral 120 (FIGS. 4 and 11).

The clamping connector member 120 comprises a substantially cylindrical housing 122 having a threaded inner cavity 124 (FIG. 4) for engaging the inner end 111 of the horizontal strut 110.

An inner disc 126 constructed of an electrically insulated material is formed with a plurality of aperatures 128 corresponding in number to the terminals on the flat surface 46 of the body section 36. The aperatures 128 may include sleeves 129 of brass or other suitable material to strengthen the edges of the apertures. The leads 29 of the branch cable 28 extend through these apertures as shown in FIG. 11.

An outer disc 130 includes holes 132 similar to number to the apertures 128 of the inner disc 126. An electrically conducting bead 134 (see FIG. 4) is positioned inside each hole 132. Each bead 134 is locked in place by an O-ring 136 (FIG. 4). The leads 29 of the branch cable 28 are terminated at the beads 134. The inner disc 126 and outer disc 130 are formed from a compressible material. Although the inner and outer discs are shown as separate parts, they could be constructed as one piece.

When the clamping connector member 120 is clamped to the flat surface 146 of the body section 36, the inner disc 126 and the outer disc 130 are compressed to form a pressure seal while the beads 134 locked in place by the O rings contact the electrical terminals 57 to 62.

The inside of the housing 122 includes an inner shoulder 138 and an outer shoulder 140 (FIGS. 4 and 11). The inner disc 126 is supported by the inner shoulder 138 and the outer disc 130 is supported by the outer shoulder 140 when the inner end 111 of the horizontal strut 110 engages the threaded cavity 124 of the clamping connector member 120.

A pair of opposed ears 142 protrude outwardly from the housing 122 (FIGS. 4 and 11). An aperture 144 is formed in each ear 142.

As may be seen from FIG. 4, the clamping connector member 120 is clamped to the flat surface 46 of the body section 36 by the cooperation of a clamping plate 146 and a pair of bolts 148, 150. The bolts 148, 150 extend through the apertures 144 of the ears 142, and openings 153 formed in the clamping plate 146. Suitable nuts 152 are tightened on the opposed ends of the bolts 148, 150. The clamping plate 146 is dimensioned to fit on the flat surface 47 between the opposite protruding edges 47' extending outward from the flat surface. When the nuts 152 are sufficiently tightened against the ears 142 and clamping plate 146, the clamping member 120 is rigidly connected to the body section 36 and positive electrical contact is made between the beads 134 and terminals 57 to 62.

If the magnet 100 is used to control the electrical connection of the branch cable 28 with the main cable 26, an elongated opening 154 may be formed in the magnet 100 to receive the bolt 150. A right-angle bracket 155 having a first leg 156 and a second leg 157 affords additional support for the magnet 100. The first leg is sandwiched between the ear 142 and the nut 152 and the second leg 157 contacts the outer end of the magnet 100. Thus, the bolt 150 cooperating with the bracket 155 maintains the magnet 100 in an abutting relationship with the flat surface 48.

A connecting gland 160 is attached to the outer end 113 of the horizontal strut 110. Gland 160 may be of the type disclosed in Hawke U.S. Pat. No. 2,858,358. The gland 160 is suitable for supporting the load bearing cable portion 162 (FIG. 3) of the branch cable 28. One end of the cable portion 162 is tied to the gland 160 and the opposite end is attached to the instrument 24.

From the drawings and the foregoing description, it should be apparent that a novel submarine cable connector has been provided which accomplishes the aforestated objects in an efficient and simplified manner. Thus, by providing an electrical control means accessible from the outside of the connector, an electrical connection between the main cable 26 and the branch cable 28 may be made or broken without detaching the mechanical connection between the main cable and branch cable.

An easily detachable clamping connector member 120 is provided for electrically and mechanically associating the branch cable 28 with the main cable; thereby permitting the main cable 26 to be conveniently reeled on a cable drum.

Furthermore, by providing a hollow body section 36, the upper and lower cable segments 64, 64' may be connected together inside the body section whereby the outer ends of the body section 37 are closed by caps 71 and thereby affording a liquid tight connection.

Moreover, the clamping connector member 120 for connecting the branch cable 28 to the main cable 26, forms a liquid tight seal when secured to the body section.

In addition, the cable connector 20 includes a hangar section 34 capable of reliably supporting instruments and thus assuring their safe retrival.

The foregoing description of preferred embodiments of this invention is intended merely as illustrative of this invention.

We claim:

1. In a cable connector having connecting means for connecting a first electrical cable segment to a second electrical cable segment and for connecting an electrical branch cable to at least one of said segments, said connecting means comprising:
    electrical control means to control the electrical connection and disconnection of said one cable segment with said branch cable;
    a hollow body section for connecting at least one of said cable segments with said branch cable, said electrical control means being operable from the outside of said body section for controlling the electrical connection and disconnection of said one cable segment with said branch cable, said body section comprising an upper neck and a lower neck with an intermediate portion interposed therebetween, said cable segments being supported on said necks; and
    at least one electrical terminal being mounted to the intermediate portion of said body section for electrical connection with said branch cable, said one cable segment comprising at least one electrical conducting post, said control means including a movable electrical contact member having at least one electrical conducting button connected to said one terminal and a leaf spring fixedly associated with said movable member, said control means having an operative position whereby said leaf spring bows and said movable member moves toward said post causing said button to contact said post and electrically connect said branch cable with said one segment.

2. The cable connector of claim 1 wherein said control means comprises:
    a protruding member disposed between the outer ends of said leaf spring; and
    a magnet secured to the outside of said body section, the cooperation of the magnetic force of said magnet and said protruding member causing the portion of the leaf spring between the outer ends to bow whereby said button contacts said post to electrically connect said cable segment with said cable branch.

3. The cable connector of claim 1 wherein said movable contact member further comprises:
    a support base having a bottom wall and side walls;
    a pair of pintles are spaced apart and attached to said side walls, said pintles being spaced above the bottom wall and spanning across the width thereof, the outer ends of said leaf spring being removably secured underneath said pintles and thereby supporting the movable member on said support base.

4. The cable connector of claim 3 wherein:
    the bottom wall of said support base includes spaced apart holes, said body section having openings formed therein, said holes and openings being aligned when the movable contact device is operatively positioned inside the body section; and
    said control means comprises protruding members extending through said holes and openings, the inner ends of the protruding members being positioned between the outer ends of said leaf spring, the movement of said protruding member being controllable from the outside of said body section, said protruding members having an operative position whereby the force exerted by the inner ends of the protruding members on the leaf spring causes the outer ends of the leaf spring to brace against the pintles and the portion of the leaf spring between its outer ends to bow inwardly whereby said button contacts said post to enable electrical contact between the cable segment and cable branch.

5. The cable connector of claim 3, wherein the bottom wall of said support base includes a pair of spaced apart holes and said control means comprises:
    a pair of protruding members extending through said holes, the inner ends of the protruding members being positioned between the outer ends of the leaf spring; and
    a magnet secured to the outside of said body section, the magnetic force from said magnet securing said support base inside the body section, the cooperation of the magnetic force from said magnet and said protruding members causing the outer end of the leaf spring to be attracted outwardly toward the bottom wall of the support base and the portion of the leaf spring between the outer ends to be bowed due to the obstruction provided by said protruding members, the bowing of the leaf spring moving the movable member inwardly whereby said button contacts said post.

6. The cable connector of claim 5 wherein:
    said protruding members have a cross-sectional area less than the diameter of the hole to permit substantially free movement therein;
    a groove is formed in the outside surface of the bottom wall of the support base; and
    a wire member extends across said groove and connects the outer ends of said protruding members together, the outer ends of said protruding members normally extending out from the outside surface of said bottom wall of the support base, the attraction of said support base to the wall of the body section forcing the protruding members inwardly and in an abutting relationship with said leaf spring, whereby the outer ends of the leaf spring are braced against said pintles and the portion of the leaf spring between the outer ends bows outwardly, the bowing of the leaf spring causing said button to contact said terminal for electrically connecting the branch cable to the main cable.

References Cited

UNITED STATES PATENTS

| | | |
|---|---|---|
| 2,703,870 | 3/1955 | Minto. |
| 2,706,225 | 4/1955 | Freeman. |
| 2,761,111 | 8/1956 | Klostermann. |
| 2,858,518 | 10/1958 | Chrystie et al. |
| 3,137,470 | 6/1964 | Feldman _____ 248—221 |
| 3,243,152 | 3/1966 | Harling _____ 248—221 |
| 3,281,558 | 10/1966 | Weber _____ 339—157 X |
| 3,295,096 | 12/1966 | Clayton et al. _____ 339—184 |
| 3,382,946 | 5/1966 | Smith et al. _____ 340—7 |

ROBERT K. SCHAEFER, Primary Examiner

D. SMITH, Jr., Assistant Examiner

U.S. Cl. X.R.

339—197, 157, 63